United States Patent
Pereira et al.

(10) Patent No.: US 7,964,016 B2
(45) Date of Patent: Jun. 21, 2011

(54) PROCESS FOR EXTRACTION OF NICKEL, COBALT, AND OTHER BASE METALS FROM LATERITE ORES BY USING HEAP LEACHING AND PRODUCT CONTAINING NICKEL, COBALT, AND OTHER METALS FROM LATERITE ORES

(75) Inventors: Geysa Santos de Pontes Pereira, Minas Gerais (BR); Oliver Renato de Araujo Gobbo, Minas Gerais (BR)

(73) Assignee: Companhia Vale Do Rio Doce, Minas Gerais (BR)

( * ) Notice: Subject to any disclaimer, the term of this patent is extended or adjusted under 35 U.S.C. 154(b) by 684 days.

(21) Appl. No.: 11/604,892

(22) Filed: Nov. 28, 2006

(65) Prior Publication Data
US 2007/0209481 A1  Sep. 13, 2007

(30) Foreign Application Priority Data

Nov. 28, 2005  (BR) ..................... 0505828
Oct. 30, 2006  (BR) ..................... 0605643

(51) Int. Cl.
C22B 3/08  (2006.01)
C22B 23/00  (2006.01)

(52) U.S. Cl. .................... 75/743; 75/750; 423/150.1

(58) Field of Classification Search ............. 75/711, 75/712, 738, 743, 746, 749, 750, 770–773; 423/138, 150.1
See application file for complete search history.

(56) References Cited

U.S. PATENT DOCUMENTS 5,077,021 A  12/1991  Polizzotti ................ 423/27
6,312,500 B1 * 11/2001  Duyvesteyn et al. .......... 75/712

FOREIGN PATENT DOCUMENTS

| GR | 1001555 | 12/1978 |
| GR | 1003569 | 12/1978 |
| WO | WO2004/031422 | 4/2004 |
| WO | WO2005/005671 | 1/2005 |

OTHER PUBLICATIONS

D.J.A. van Zyl et al. Introduction to Evaluation, Design, and Operation of Precious Metal Heap Leaching Processes, Society of Mining Engineers, Inc., Littleton, CO, 1988, p. 13-16 and 82.*
R. Thiel and M.E. Smith, State of the Practice Review of Heap Leach Pad Design, Proceedings of the 17th Annual GRI Conference: Hot Topics in Geosynthetics-IV, Las Vegas, NV, Dec. 15, 2003, 17 pages.*

* cited by examiner

*Primary Examiner* — George Wyszomierski
*Assistant Examiner* — Mark L Shevin
(74) *Attorney, Agent, or Firm* — Arent Fox, LLP

(57) ABSTRACT

The present invention embodies a process for extraction of nickel, cobalt, and other metals from laterite ores by heap leaching, and of the product obtained as well, characterized by the fact that it is comprised of crushing (I), agglomeration (II), stacking (III), and heap leaching (IV) stages, with this last stage being a continuous, counter-current, heap leaching system with two or more stages, comprised of two phases, one of which is composed of the ore (solute), and the other is composed of the leaching solution, or solvent, which are supplied at opposite ends of a series of stages and flow in opposite directions. Upon cessation of leaching in the last stage, its solute is removed and a new stage is introduced at the first position, formed by new ore (solute) to be leached by the solvent solution, which is introduced from the last stage, percolating or flowing though all the previous stages until it reaches the first stage, being separated if loaded with target metals (PLS).

19 Claims, 12 Drawing Sheets

PROCESS FOR EXTRACTION OF NICKEL, COBALT, AND OTHER BASE METALS FROM LATERITE ORES BY USING HEAP LEACHING AND PRODUCT CONTAINING NICKEL, COBALT, AND OTHER METALS FROM LATERITE ORES

The present invention comprises a process for extraction of nickel, cobalt, zinc, iron, and copper, among other metals, from lateritic ores, with less investment and lower operational costs than those of processes known to the person skilled in the art. The process according to the invention employs heap leaching, which is a process for extraction of soluble constituents from a mixture of piled up laterite solids by percolation with acidic solutions.

STATE OF THE ART

Generally, extractive metallurgy is defined as the art and science of extracting metals from minerals and/or materials containing them by physical and chemical methods. Extractive metallurgy can be divided into three major branches: hydrometallurgy, pyrometallurgy, and electrometallurgy.

Hydrometallurgy is the technique of extracting metals by aqueous physicochemical processes; pyrometallurgy involves dry physicochemical processes at elevated temperatures; and electrometallurgy deals with electrolytic methods. Normally, electrometallurgy is integrated with the other two processes, with electrolysis in aqueous media being used in hydrometallurgy, and electrolysis in smelted media being used in pyrometallurgy.

Extractive metallurgy also relies on distinct unit operations to enable and enhance metal concentration and/or separation, which include, among others: comminution methods (crushing and milling), physical concentration methods (magnetic, gravity, and electrostatic separation), physicochemical concentration methods (flotation), and solid-liquid separation methods (thickening, filtration and drying).

Hydrometallurgy is carried out in three distinct, sequential physicochemical stages: (a) selective dissolution of metals contained in the solid phase (leaching); (b) purification and/or concentration of the aqueous solutions containing the target metals (precipitation, cementation, ionic exchange, or solvent extraction); and (c) selective recovery of metals (electrowinning, electrorefining, and hydrogen reduction).

The application of hydrometallurgical routes in metal recovery has increased significantly over the last fifty years, with this increase being intimately related to the fact that high-grade deposits are being mined out, and as a result grades are becoming increasingly lower and minerals even more complex, requiring pre-concentration stages. In addition, this alternative has minor environmental impact and is less intensive in capital cost requirements when compared to traditional pyrometallurgical processes.

Extraction of a soluble fraction of an insoluble solid constituent by a solvent is generally called leaching, and is a mass transfer process. Taggart apud Arbiter, in *Copper Hydrometallurgy—Evolution and milestones, Hydrometallurgy—Fundamentals, Technology and Innovation*, 1993, pp. 549-565, defined it as the operation in which there is effective contact between the ore to be leached and the solvent.

Leaching can take place in ambient conditions, or at elevated temperatures and/or under pressure. Process conditions depend on the chemical reactions that take place. In all cases, the objective is to produce ions or metallic complexes that can be selectively extracted from the solution.

Any reagent to be used as solvent in a leaching process should meet at least the following qualifications as described by Gupta et al. in *Hydrometallurgy in Extraction Processes*, vol 1, p. 39:

It should dissolve the minerals quickly enough to render the process commercially feasible, and preferably should be chemically inert to gangue minerals.

It should be cost-effective and promptly available in large amounts.

If possible, it should be regenerable in processes subsequent to the leaching stage.

Besides water, which is used to leach chlorides or soluble sulfates, many different solvents have been used in different leaching applications, as shown in the examples in Table 1 below.

TABLE 1

Classification of leaching reagents

| Category | Reagent | Application |
|---|---|---|
| Acids | Diluted $H_2SO_4$ | Copper oxides, zinc oxide, lateritic nickel |
| | Diluted $H_2SO_4$ with oxidant | Cu—, Ni— and Zn-sulfides, oxidized uranium ore |
| | Concentrated $H_2SO_4$ | Sulfided copper concentrate, laterites |
| | Nitric acid | Cu—, Ni— and Mo-sulfides, uranium concentrates, zirconium oxide |
| | Hydrofluoric acid | Columbite-tantalite ore |
| | Hydrochloric acid | Titanium ores, nickel matte, reduced cassiterite |
| Alkalis | Sodium hydroxide | Bauxite |
| | Sodium carbonate | Uranium oxide, scheelite |
| | Ammonium hydroxide | Nickel sulfide, copper sulfide, reduced laterite |
| Salts | Ferric sulfate/chloride | Concentrates of base metal sulfides |
| | Cupric chloride | Concentrates of base metal sulfides |
| | Sodium or potassium cyanide | Gold and silver ores |
| | Ferrous chloride | Nickel sulfide |
| Water | Water | Sulfides and chlorides, sodium vanadate, sodium molibdate, sodium tungstanate |

Acids such as sulfuric, hydrochloric, and nitric acid are the most used in dissolution processes such as leaching. Of these, sulfuric acid is the most widely used and of lowest cost.

As is known by the person skilled in the art, according to Perry and Chilton in *Chemical Engineer's Handbook*, leaching systems are distinguished by the leaching cycle (batch, continuous, or intermittent multiple-batch); by the direction of flows (co-current, counter-current, or hybrid); by the type of stages (single-stage, multiple-stage, or differential-stage); and by the contact method (percolation or dispersed solids).

In a multiple-stage, counter-current system (Foust et allii, *Principles of Unit Operations*, 1960, pp. 43-49), the two phases enter at opposite ends of a series of balanced stages, as shown in SCHEMATIC 1 below. The phases flow in directions opposite to each other. In this way, the solute concentration in phase-L product can be increased, and higher solute recovery is possible with a smaller amount of solvent

SCHEMATIC 1

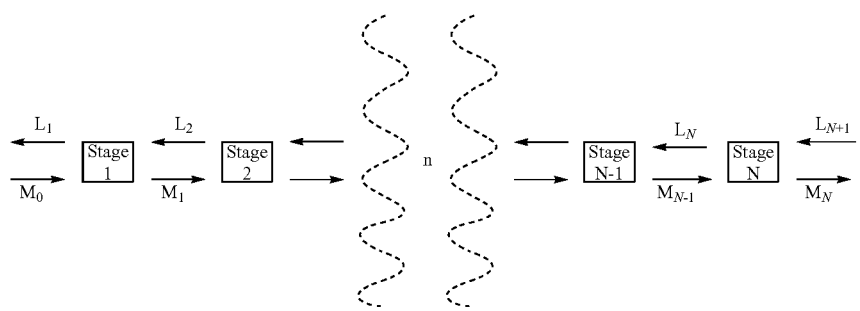

With respect to the contact method, leaching can be grouped into in-situ leaching, heap or dump leaching, (leaching by percolation) and agitated leaching (at atmospheric pressure and under pressure).

In FLOWCHART 1 below, it can be verified, in general, how unit operations can be associated with the main leaching methods currently available for treatment of ores and concentrates, according to Esteban Domic in *Hidrometalurgia— Fundamentos, procesos y aplicaciones,* 2001.

FLOWCHART 1

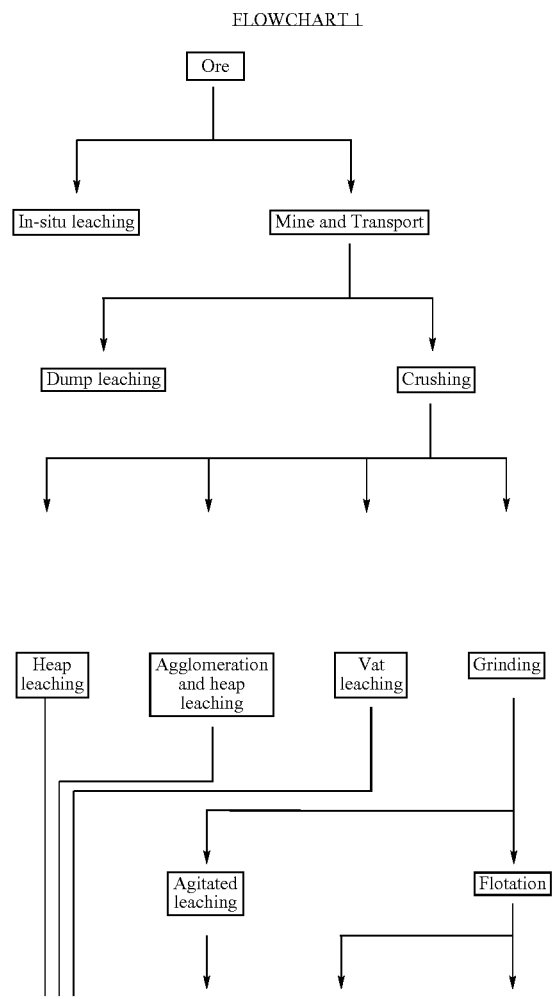

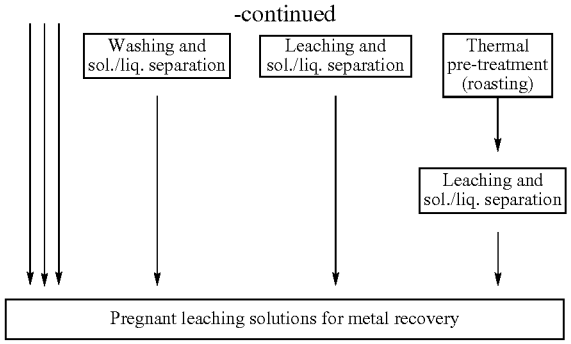

In-situ leaching consists in applying a leaching solution directly on the place where the ore is located within the deposit itself, without the need for extracting it.

Heap leaching is probably one of the oldest methods, being the oldest for copper recovery. It has been used for copper recovery in Spain since the 1700s. In this leaching method, the ore, which usually has been previously agglomerated with concentrated sulfuric acid, is piled up and the leaching solution is applied to the top of the heap from where it percolates by gravity, being collected at the bottom of the heap. Application and distribution of the leaching solution is performed at the top of the heap by means of drippers or wobbler-type sprinklers. The irrigation system is defined as a function of evaporation and water availability. The solution containing the target metal is sent for subsequent purification/extraction stages. Heap leaching is used for crushed ores, while dump leaching is used for ROM (run of mine). Dump leaching, which is very similar to the previously described process, consists in treating ores with very low grades of target metal, usually below the economic cut-off grade for the main processing line, known as mineralized waste. In the heap leaching process, heaps can be either dynamic or permanent. In the case of dynamic heaps, also called on-off heaps, in which the ore after being leached is removed to a location for final disposal of tailings, the base of the heap is re-used. In the case of permanent heaps, or static heaps, new heaps are formed on top of previous ones, either using or not the existing impermeabilized area.

Vat leaching (in static tanks) comprises a set of usually square cross-sectioned tanks, where the crushed ore is loaded and the leaching solution is applied so as to flow either upwardly or downwardly, thereby inundating the ore layer. This is a very dynamic system suitable for leaching minerals that have fast dissolution kinetics. Normally, the leaching cycle is 6 to 12 days.

Agitated leaching, either at atmospheric pressure or under pressure, requires that the ore be finely ground, and is performed in tanks where the solids are dispersed into the leaching solution by gas injection or mechanical agitation. In comparison with the other methods, leaching time is smaller due to smaller particle size (greater specific area) and to the turbulence in the tank, which provides higher diffusion between reagent and ore.

Two major differences are evident between vat leaching and agitated leaching. Firstly, in agitated leaching the liquid is the continuous phase, and secondly, this form of leaching occurs under turbulent conditions, while in vat leaching the flow is more usually laminar. There is, therefore, a substantial difference between the mass transfer rates of the two types of leaching. Higher mass transfer rates are achieved under turbulent contact conditions.

Application of heap leaching as a method for extraction of gold (cyanidation in alkaline medium), copper, uranium, nickel (sulfuric leaching in acid medium), and other minerals has increased over the last years, because of the possibility of treatment of very low grade ores that would not be economically feasible by conventional methods, and also because it is an alternative for treatment of ores that have very slow dissolution kinetics.

Heap leaching for copper is widely known. Historically, the pioneer method was used in the Rio Tinto mines, in Spain, about 300 years ago.

In copper heap leaching, the ore is crushed, then agglomerated with concentrated sulfuric acid, and piled up on a base that has been properly prepared and impermeabilized. Heap heights vary greatly, ranging from 1.5 m to 30 m. The leaching solution (dilute sulfuric acid) is sprayed on the upper surface of the heap, and percolates by gravity down through the ore. The laden solution bearing the solubilized copper is collected and sent to a copper recovery circuit which is typically a solvent extraction and electrowinning circuit. It is a very well known process, and the set of unit operations Heap leaching/Solvent extraction/Electrowinning has been applied on commercial scale for more than 40 years.

Regardless of the ore type, a process route in which the solubilization stage of the target metal is carried out by heap leaching requires ore crushing/grinding stages. It is fundamental for the process that the heap has good permeability, with good contact between the ore and the solution. As is well reported in document U.S. Pat. No. 5,077,021, ores containing excess amounts of clay minerals or fines (generally, material under 0.15 mm) present problems in this type of process, because they tend to slow down or even stop percolation in certain areas in the heap, as a result of blockage. It is of general knowledge that blockage is caused by material segregation, when fines and/or clay minerals migrate to certain areas inside the heap, thereby creating zones with markedly different percolation rates. As a result of this effect, the solution begins to flow through paths of less resistance, creating preferred flow channels. The creation of these preferred channels leaves unleached areas in the heap, with consequent lower recovery of the target metal. The formation of a "slurry" by the fine particles released and/or clay minerals, when very severe, leads to blockage. Therefore, it is mandatory to make the bed permeable for the process, either by removing fines and/or clay minerals or by agglomerating them. The agglomeration stage following crushing, as preparation of the ore to be piled up, is fundamental and inherent to the heap leaching route for any ore, be it gold, uranium, vanadium, silver, copper, zinc, or nickel, oxide or sulfide ores.

As is known by every person skilled in the art, nickel ores can be classified into two major types according to their composition, namely, sulfide and laterite (the latter being also known as oxidized). Originated in underground layers below the saprolitic region (a region rich in clay), sulfide deposits correspond to about 20% of Western nickel reserves, and are found mainly in Australia, followed by Canada, China, South Africa, and Zimbabwe. Approximately 55% of total nickel production comes from sulfide ores.

Laterite ore occurs in more superficial regions. Deposits are located mainly in Brazil, Cuba, Australia, New Caledonia, and the Philippines, with average grades around 1.95% and iron oxide grades greater than 24%, and presence of cobalt and magnesium. Laterite ore corresponds to approximately 80% of known nickel reserves.

Growing concern about ore production and cost reduction of extraction has motivated greater utilization of nickel ore of lateritic sources. Two factors contribute to increased utilization of these ores: sulfide nickel reserves involve high extraction cost, and laterite ores have higher nickel grades than sulfide ores, allowing higher efficiency, as shown in Table 2 below:

TABLE 2

|  | Ore (1,000 t) | Grade (%) | Nickel (1,000 t) | % |
|---|---|---|---|---|
| Sulfide | 10,594 | 0.58 | 62 | 31 |
| Laterite | 10,382 | 1.34 | 140 | 69 |
| Total | 20,976 | 0.96 | 202 | 100 |

Source: Mineração e Metalurgia, May 2000

Laterite ores can be treated either by hydrometallurgical route or by pyrometallurgical route. Normally, these processes involve high energy consumption, as is the case of matte smelting, smelting for Fe—Ni production, and ammoniacal leaching processes, which renders uneconomic the processing of low grade nickel laterite ores. High pressure sulfuric leaching involves lower energy consumption, but requires high investment both in equipment and as a result of the corrosive environment.

Currently, ammoniacal leaching and sulfuric acid pressure leaching are the two main hydrometallurgical techniques used for nickel and cobalt recovery from laterites. Besides the relatively aggressive chemical treatment and high capital investment involved, they are heavily dependent on costs of fuel and sulfuric acid/sulfur respectively.

Although the sulfuric acid pressure leaching process does not yield significant gains in terms of capital cost in comparison with more conventional technologies, it allows for the obtention of nickel at great economic advantage in terms of operational cost. The process also allows for high levels of cobalt recovery, generating sufficient energy to the operational cycle, albeit requiring large production scales.

Nickel and cobalt high prices have also driven the industry towards seeking alternative processes to reduce operational costs, so as to maintain business profitability at lower price levels for both nickel and cobalt.

The great interest arisen in nickel production over the last years has led to the development of a range of new process routes for the treatment of lateritic ores, such as heap leaching, among others. Heap leaching is an operation that involves low investment and operational costs, is very well known, and is widely applied mainly for copper, uranium, and gold ores.

Although widely used, conventional techniques for extraction of metals from lateritic ores may render the process economically infeasible, mainly because of the variability in the prices of fuels and acids required for the said processes.

The use of heap leaching for lateritic ores represents a technological milestone for the nickel industry, because it not only renders mining of small or low-grade deposits economically feasible, but also is a mineral processing alternative that requires significantly lower investment when compared to the above-mentioned conventional processes.

Although already studied and published in other documents, such as patent processes GR 1001555, GR 1003569T, U.S. Pat. No. 6,312,500, WO 2004/031422 and WO 2005/005671, the concepts of heap leaching as proposed therein present process conditions and system configurations completely different from the ones that are proposed in the present application for patent, as shall become evident along the descriptive report.

The first studies concerning this application were carried out by S. Agatzini and originated the Greek patent GR 100155. The document describes two heap leaching techniques applied to ores containing low grades of nickel. Technique I considers a circuit option in which the leaching solution is recirculated, that is, is applied to the ore in a number of contacts until increases in the concentration of nickel effluent from the process are no longer observed. After this stabilization, a new solution is prepared and applied to the ore. The solvent used is sulfuric acid, and the initial concentration of the acid solution is 1N. Percolation rates of about 4 to 33 L/h/m2, preferably between 12.5 and 25 L/h/m2, are considered. As discussed in this technique, generally, the solution that results from the leaching process is diluted, with low concentrations of the metals, and is highly dependent on the type of ore and the stage of the process. Technique II addresses basically the same process described in technique I, and includes a pH correction of the leaching solution after each recycle, before it is re-applied to the heap. pH is corrected to its initial value. The leaching process is considered to be completed when there is no further increase in the nickel concentration in the solution. The resulting solution may be used subsequently to leach another material exactly in the same way, until the desired nickel concentration in the solution is achieved. It is emphasized that the technique as presented with continuous recycles does not inhibit leaching, except when the solution is saturated with a specific element, in which case precipitation in the form of a chemical sediment is observed. According to this technique, during the heap leaching process of laterite nickel ore, aluminium is the first metal to precipitate after the solution becomes saturated.

Patent GR 1003569T describes nearly the same characteristics as described in document GR 1001555, with common water being substituted by water of various chemical compositions, or water from industrial/municipal effluents, or even sea water, which allegedly does not affect the extraction of nickel and additionally increases the recoverable amounts of Mg, Ca and Na from the percolated liquor.

Document U.S. Pat. No. 6,312,500 presents a heap leaching process for nickel lateritic ores that contain a substantial amount of clay materials, with this substantial amount being defined as more than 25% of clays. If necessary, the ore is crushed to the size desired, smaller than 25.0 mm, preferably between 19.0 mm and 3.35 mm. The process includes an agglomeration stage previous to formation of the heap, with sulfuric acid, due to the fines present in the ore. Agglomeration is carried out in conventional equipment or in any unit that allows for this unit operation. Alternatively, after agglomeration, the ore is cured. Cure time may vary from one hour to three days. This stage is performed by depositing the agglomerated ore in an open area, in the open air. The agglomerated ore is then stacked to form a heap whose height may range between 60 cm to about 9 m. Two or more heaps may be formed. The acid solution is applied to the top of the heap, at a rate of 10 to 20 L/h/m2. The leaching process itself is described as follows. The first heap is leached by a fresh H2SO4 solution with a concentration of at least 10 g/L. If the pH of the effluent leached solution from the heap is greater than 2 (or if free acidity is less than 1 g/L), then the solution can be directed to nickel recovery. If the pH is less than 2, the liquor is directed to heap 2. Additionally to the liquor from heap 1, a new H2SO4 solution (with a concentration of at least 10 g/L) is applied to heap 2. The liquor from heap 2 is also analysed for free acidity. If the pH is greater than 2 or free acidity is less than 1 g/L, then the liquor can be directed to nickel recovery. At these acidity levels, it is not necessary to subject the liquor to the subsequent neutralizing stage, as the nickel can be extracted directly from the solution, for example by ion exchange. Most of the liquor is subjected directly to nickel extraction, but still a portion is directed to a third heap. The process may proceed for many heaps.

Although in Patent WO 2004/031422 it is stated that the method is not specific to nickel, this element is included in one of its claims. It is claimed that the ore should be agglomerated. The claimed leaching solution contains sulfuric acid and dissolved sulfur dioxide, and the solution is purged to the nickel recovery circuit, with the said sulfuric acid of the leaching solution having a concentration of about 785 g/L. In this invention, the sulfur dioxide is added to the leaching solution before it is applied to the heap.

OBJECTIVES AND ADVANTAGES OF THE INVENTION

The application for patent at issue, differently from the others mentioned hereinabove, proposes a method of continuous processing, in which ore leaching is carried out in a counter-current system comprised of at least 2 stages, with each stage being represented either by a heap section or by a heap.

The objective of the present invention has been to develop a very competitive option for extraction of nickel, cobalt, zinc, and copper among other base metals, from lateritic ore, with lower investment and lower operational costs than those of the other established technological routes, as well as to solve, economically, the problem of extracting nickel from low-grade ore and/or small deposits.

Another objective of the present invention has been to significantly reduce sulfuric acid consumption by the system, reaching levels of 350 kg of acid per ton of treated ore, with nickel extractions varying from 70% to 90% depending on the mineralogical composition, in addition to providing a shorter leaching cycle and favouring the water balance of the system, and presenting improved selectivity for extraction of target metals in relation to the gangue, and dramatically reducing the total volume of the solution.

The invention comprises a continuous process in which ore leaching is carried out in a counter-current system using at least 2 stages, with each stage being represented by either a heap section or a heap, which can be applied to ores containing large amounts of natural fines, and being an option for the treatment of coarse fractions (>0.5 mm) as well. Such said heap leaching is presented as an optimal alternative for extraction of nickel, cobalt, and zinc among other base metals, from laterite ore, with lower investment and lower operational costs than those of the other established technological routes, as well as for solving, economically, the problem of extracting nickel from low-grade ore and/or small deposits.

DESCRIPTION IN BRIEF

The invention comprises a process for extraction of nickel, cobalt, and other metals from laterite ores by heap leaching, comprised of crushing (I), agglomeration (II), stacking (III), and heap leaching (IV) stages, with this last stage being a continuous, counter-current, dynamic-heap leaching system comprised of two phases, one of which is composed of the ore (solute), and the other is composed of the leaching solution, or solvent, which are supplied at opposite ends of the series of stages and flow in opposite directions. Upon cessation of leaching in the last stage, its solute is removed and a new stage is introduced at the first position, formed by new ore (solute) to be leached by the solvent solution, which is introduced from the last stage, percolating or flowing through all the previous stages until it reaches the first stage, being separated when loaded with target metals (PLS—Pregnant Leach Solution).

DETAILED DESCRIPTION OF THE INVENTION

The invention comprises a process for extraction of nickel, cobalt, and other metals from lateritic ores by using heap leaching, comprising a continuous process in which ore leaching is carried out in a counter-current system using at least 2 stages, with each stage being represented either by a heap section or by a heap, which can be applied to ores containing large amounts of natural fines, and is an option for the treatment of coarse fractions (>0.5 mm) as well. Such said heap leaching presents itself as an optimal alternative for extraction of nickel, cobalt, and zinc among other base metals, from laterite ore, with lower investment and lower operational costs than those of the other established technological routes, as well as for solving, economically, the problem of extracting nickel from low-grade ore and/or small deposits.

DIAGRAM 2, enclosed hereto, is a block diagram representing schematically the overall flowchart for the process up to the obtention of a solution rich in the target metal; and DIAGRAM 3, enclosed hereto, is a schematic drawing of the very counter-current heap-leaching stage.

The present invention comprises a hydrometallurgical processing route for the treatment of nickel lateritic ores, in which the solubilization stage of the metal values takes place by heap leaching.

DIAGRAM 2, enclosed hereto, is a schematic representation of the overall flowchart of the process up to the obtention of a solution rich in the target metal. Generally, the proposed route is comprised of crushing (I), agglomeration (II), stacking (III), and heap leaching (IV) stages.

The run-of-mine, ROM (O), is crushed so as to have its grain size suited to the process. Crushing is performed in as many stages as required to achieve the grain size suitable for the process, depending on the characteristics of the ore. Generally, a maximum grain size between approximately 25.0 mm and approximately 50.0 mm is obtained in secondary crushing, and a maximum grain size between approximately 12.5 mm and approximately 6.30 mm is obtained in tertiary crushing. Two-stage crushing is sufficient for highly porous ores (large specific area) containing large amounts of fines. In the case of more compact and more competent ores, tertiary and even quaternary crushing may be used to provide a larger reaction surface. Fines generation should be minimized in these unit operations.

Figure 1:
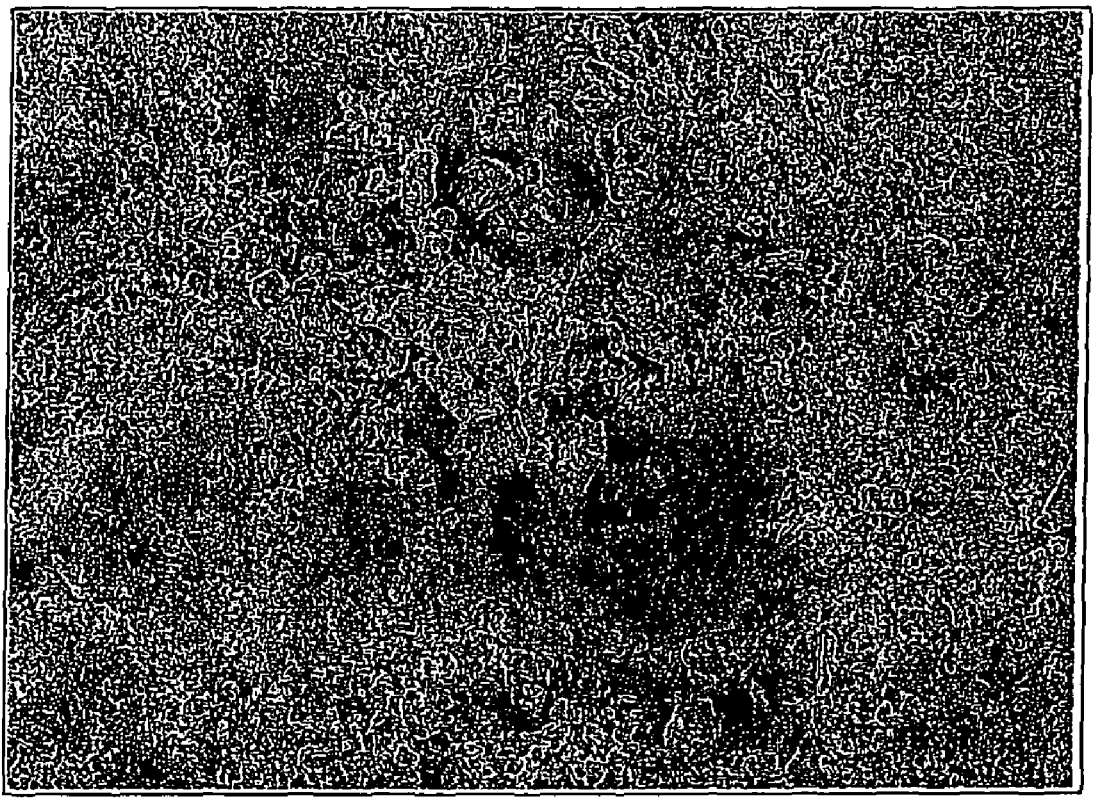
FIG. 1—is a type of ore used as a sample in the process described of the present invention.
Figure 2:
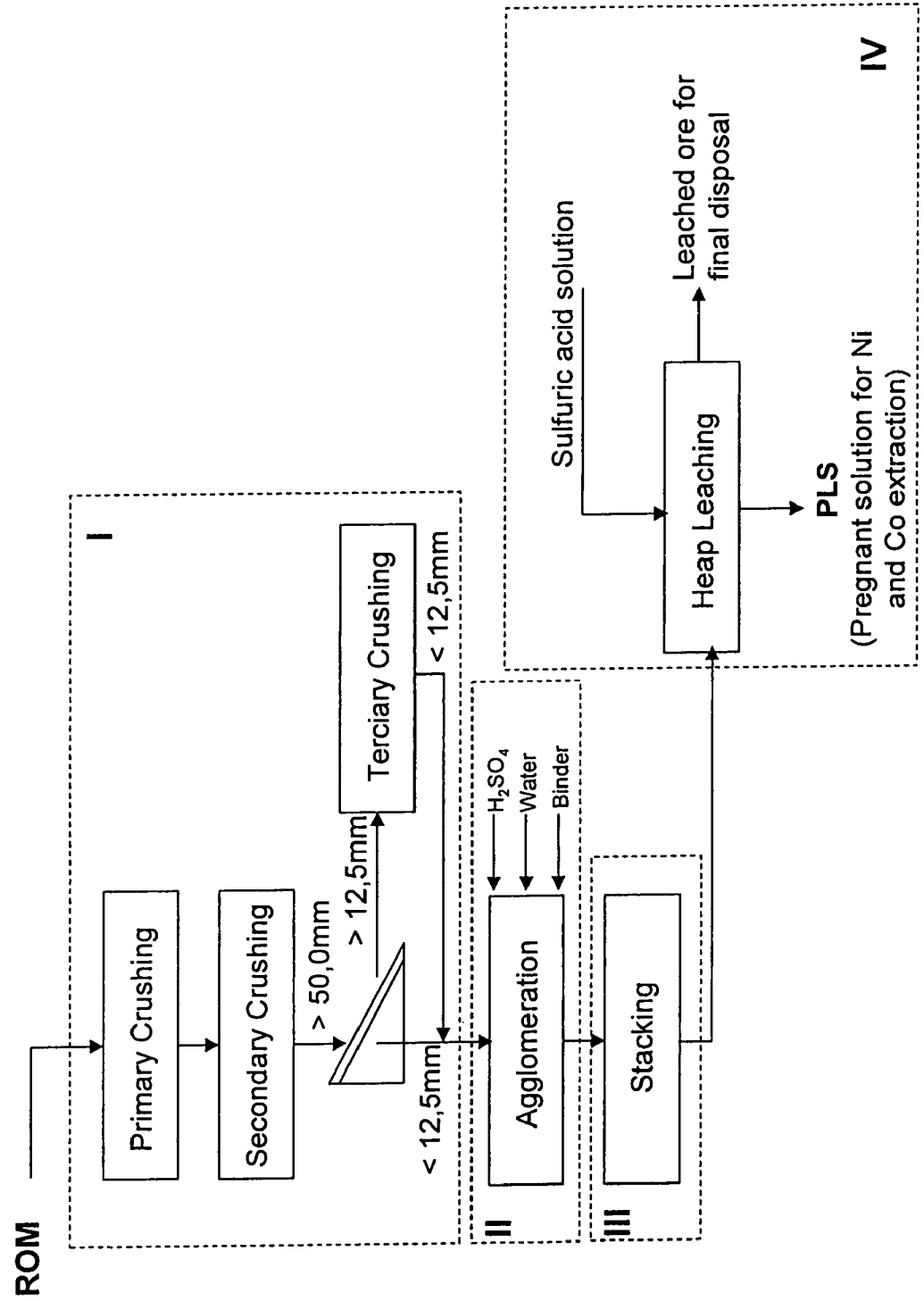
FIG. 2—is a block diagram representing schematically the overall process
Figure 3:
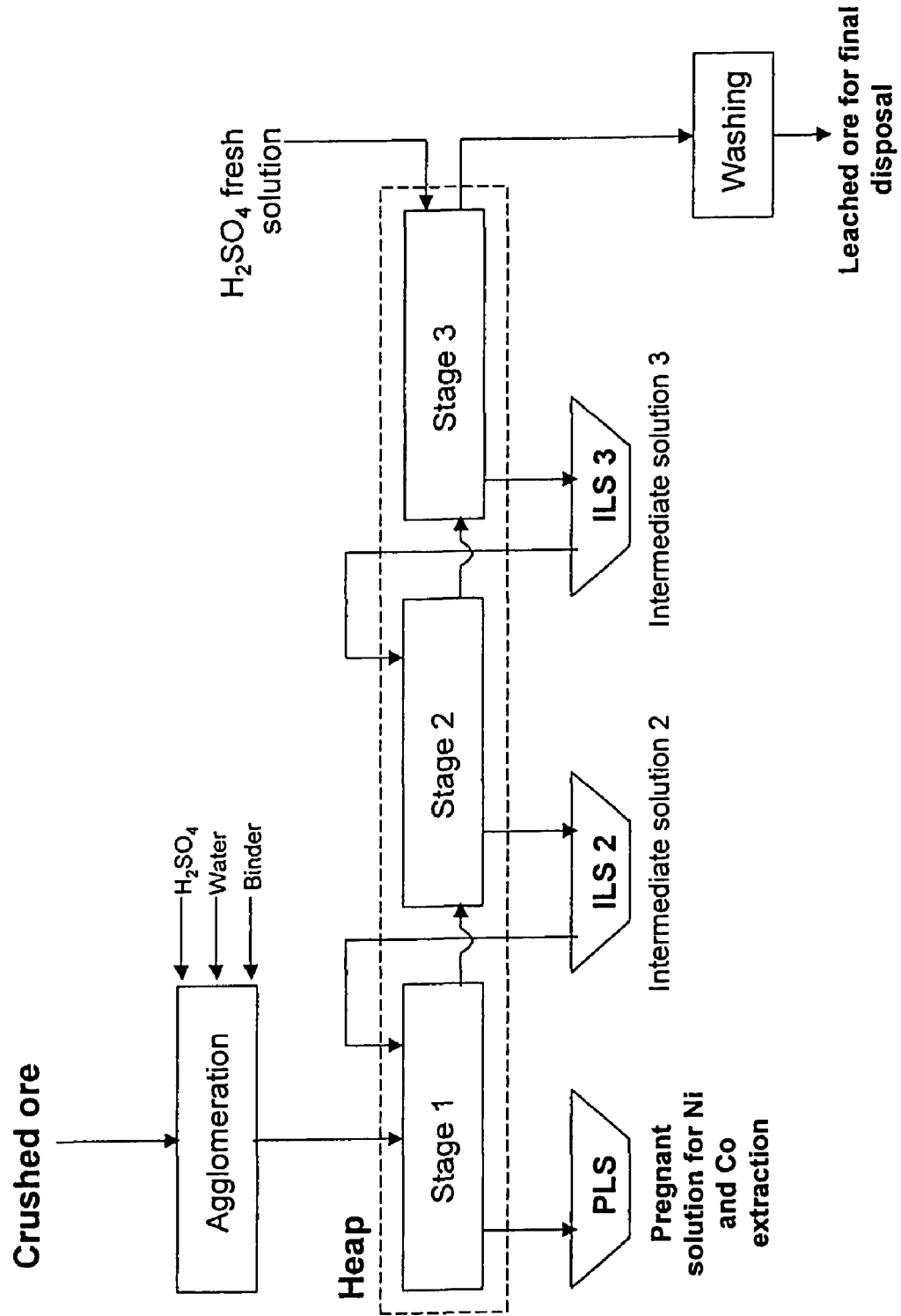
FIG. 3—is a schematic drawing of the counter-current heap-leaching stage
Figure 4:
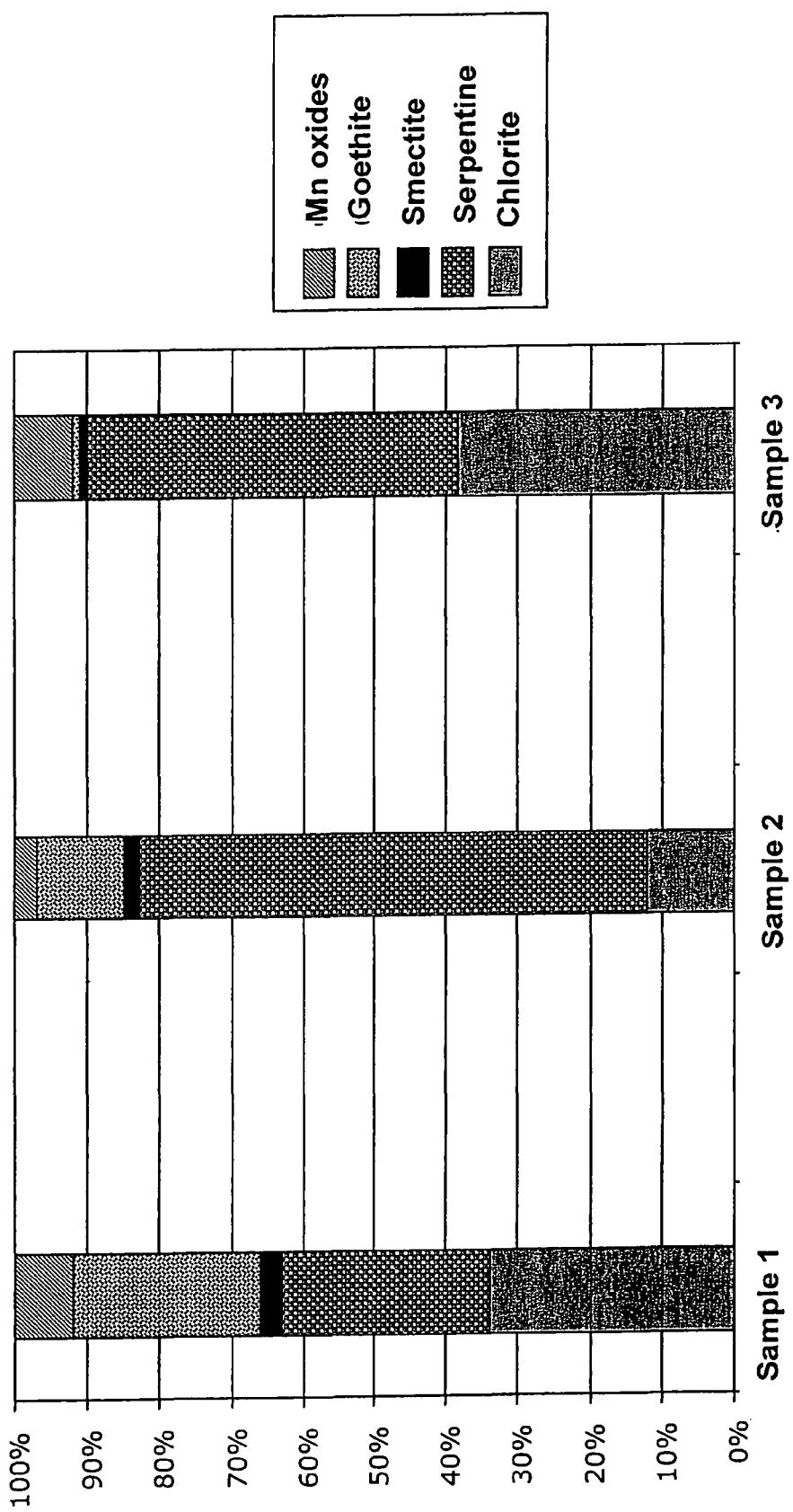
FIG. 4—shows the nickel distribution for three samples of laterite ore
Figure 5:
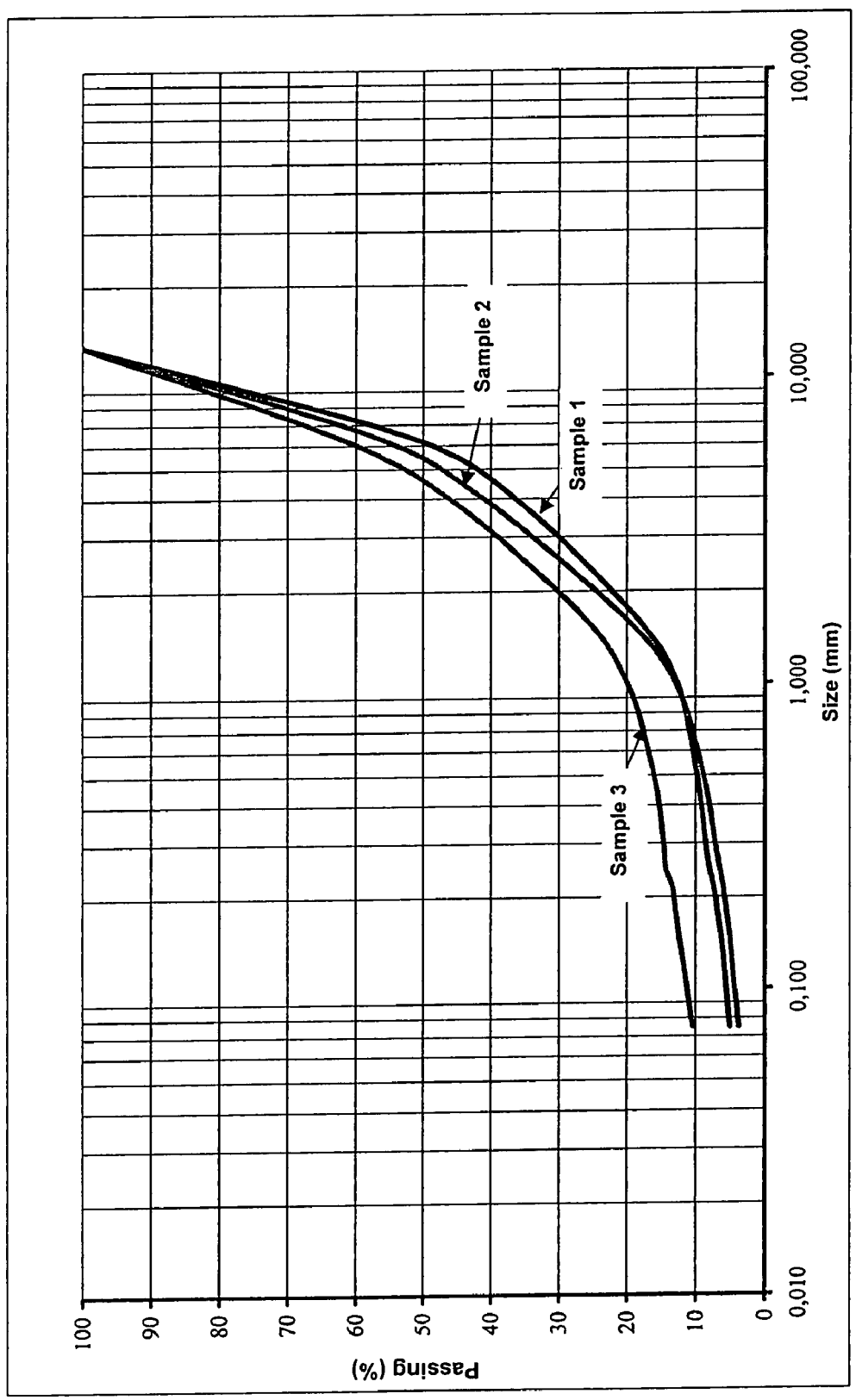
FIG. 5—shows the size distribution of the three samples of a laterite ore
Figure 6:
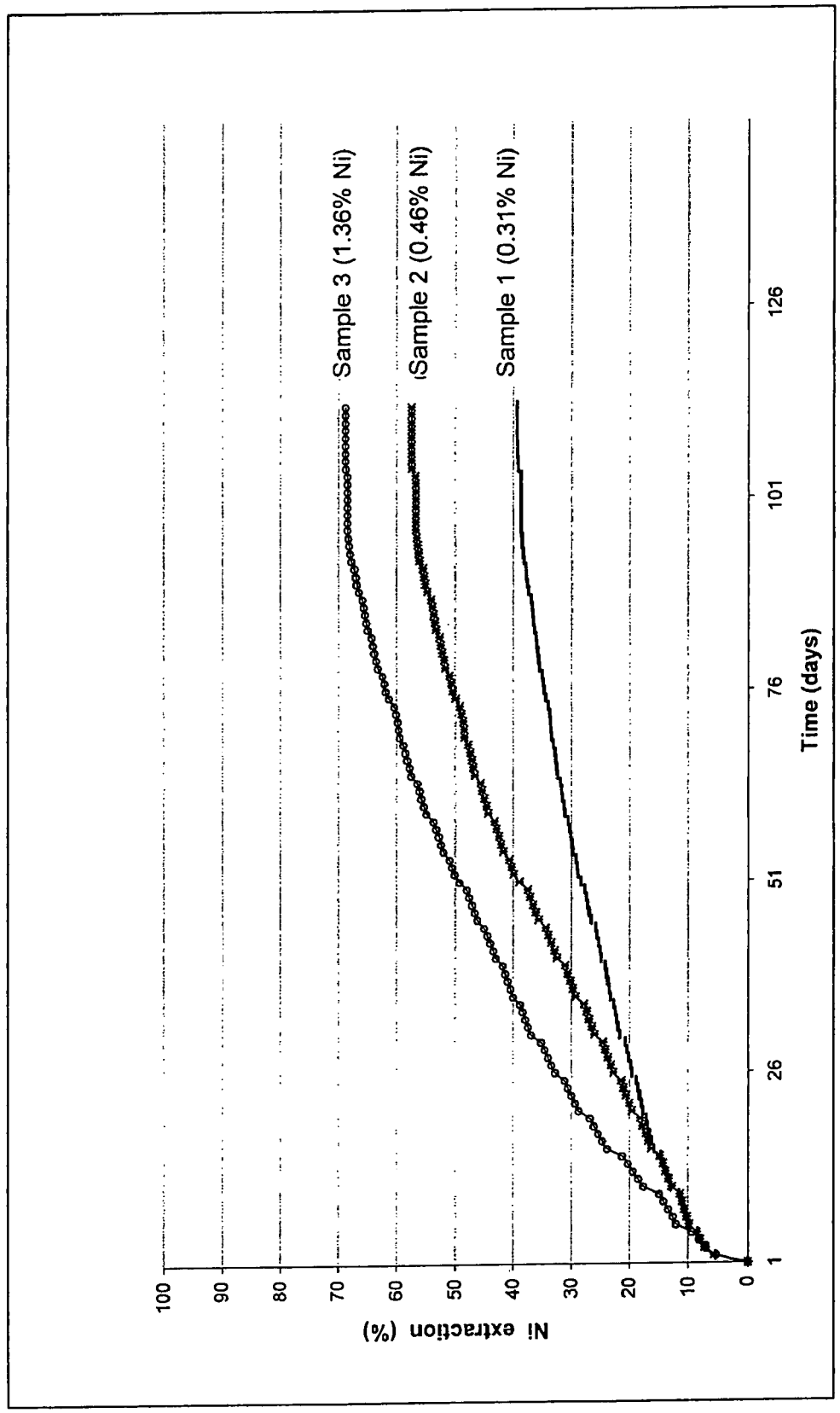
FIG. 6—shows nickel extraction curves obtained from column leaching tests with three samples of nickel laterite ore FIG. 7—shows nickel extraction curves for saprolitic ore, from leaching tests using b 1-m columns FIG. 8—shows nickel extraction curves for ferruginous or limonitic ore from leaching tests using 1-m columns FIG. 9—shows the stages of the heap leaching process FIG. 10—shows the nickel extraction curves obtained for four typologies FIG. 11—shows three different options of heap leaching circuits FIG. 12—shows the impact of two different top sizes (12.5 mm and 50.0 mm) on nickel extraction
Figure 7:
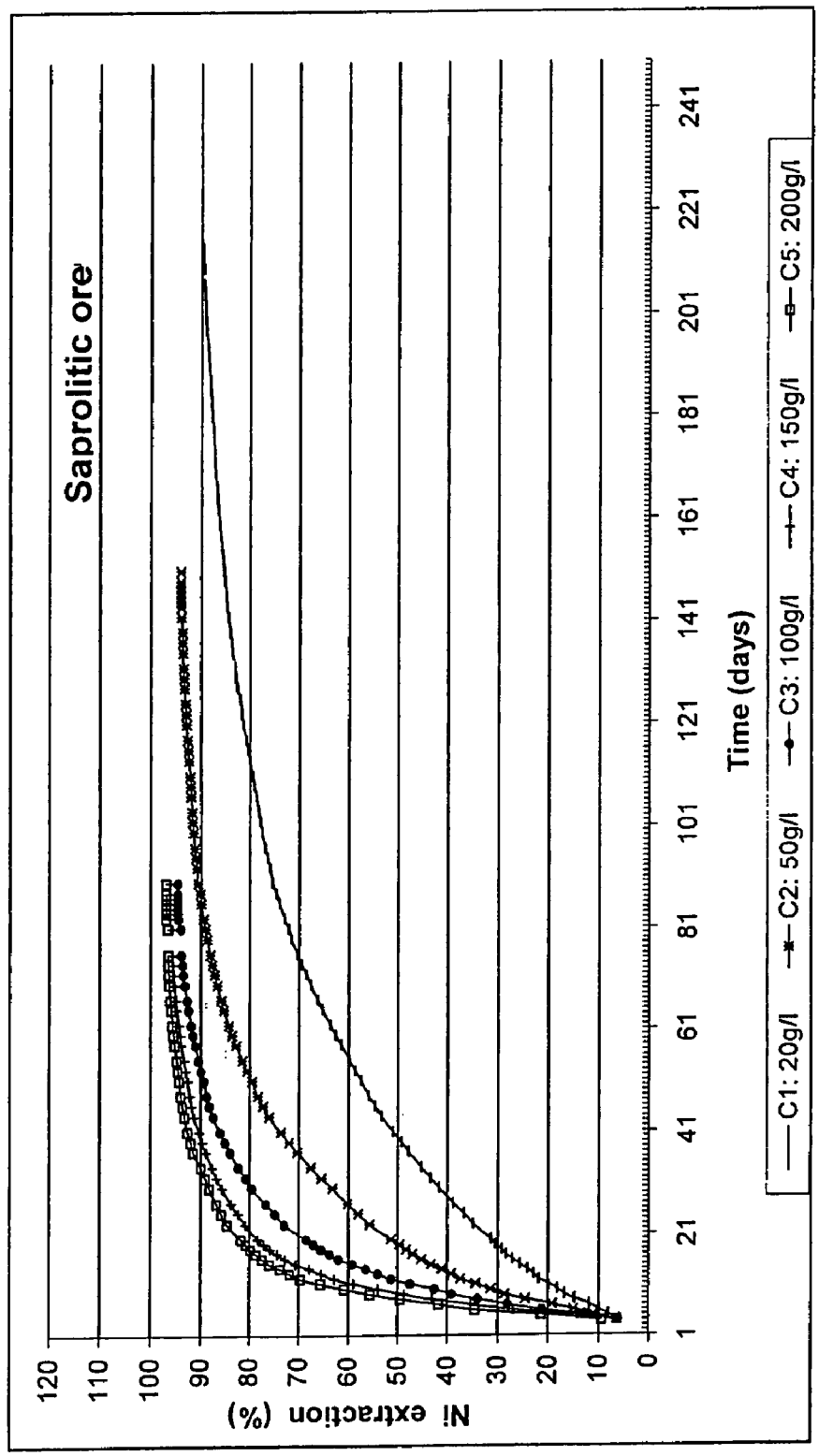
Figure 8:
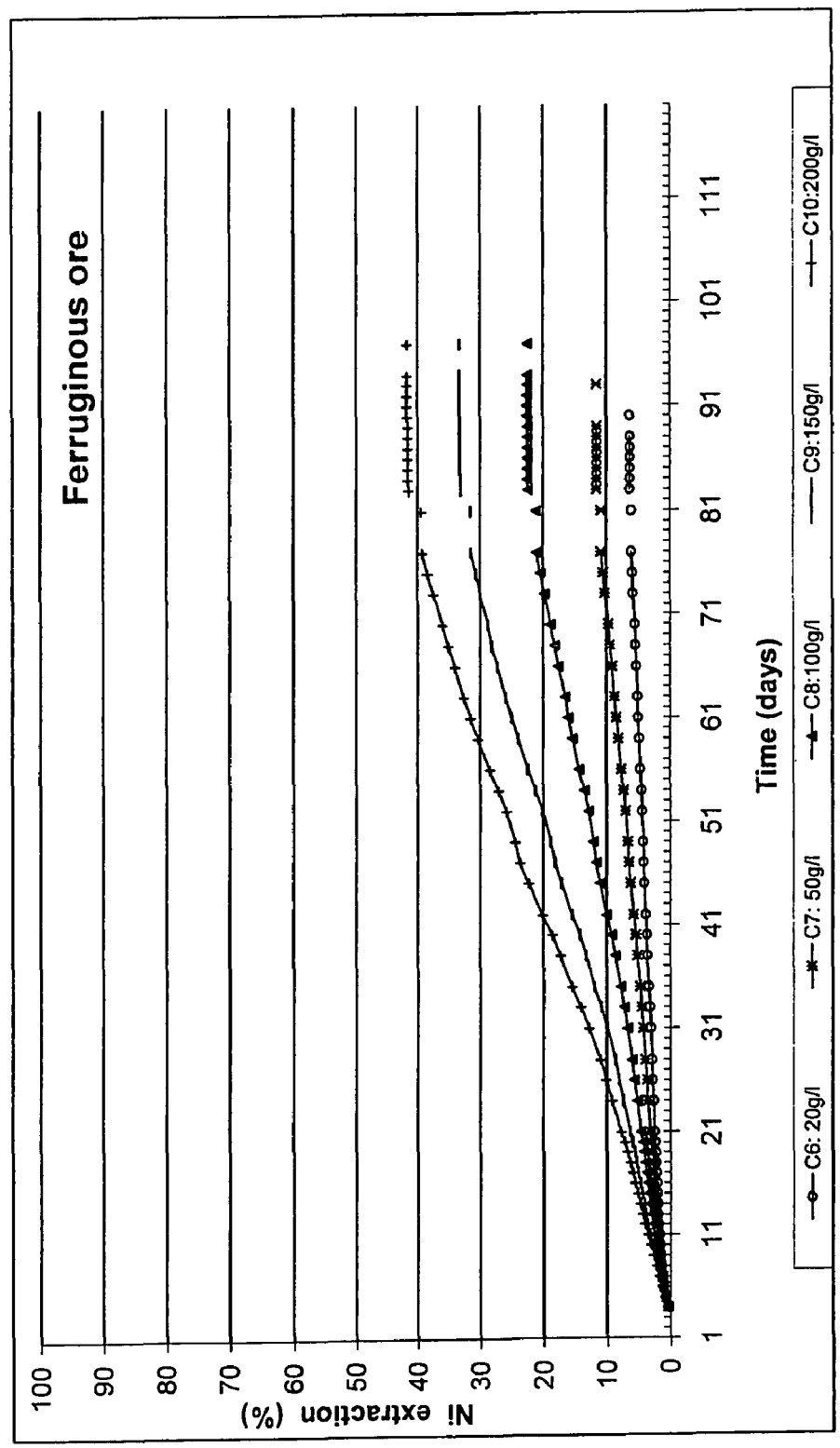
Figure 9:
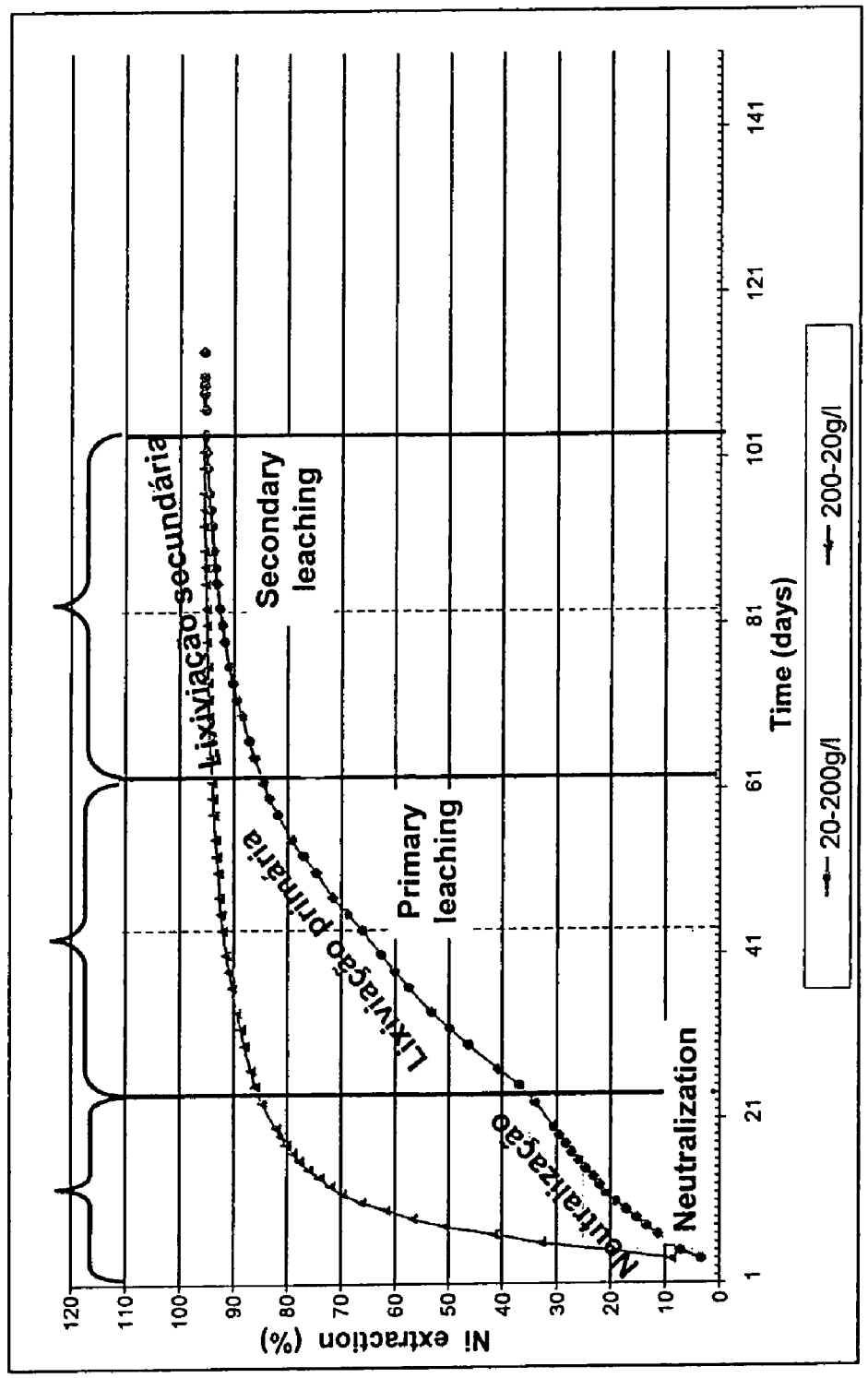
Figure 10:
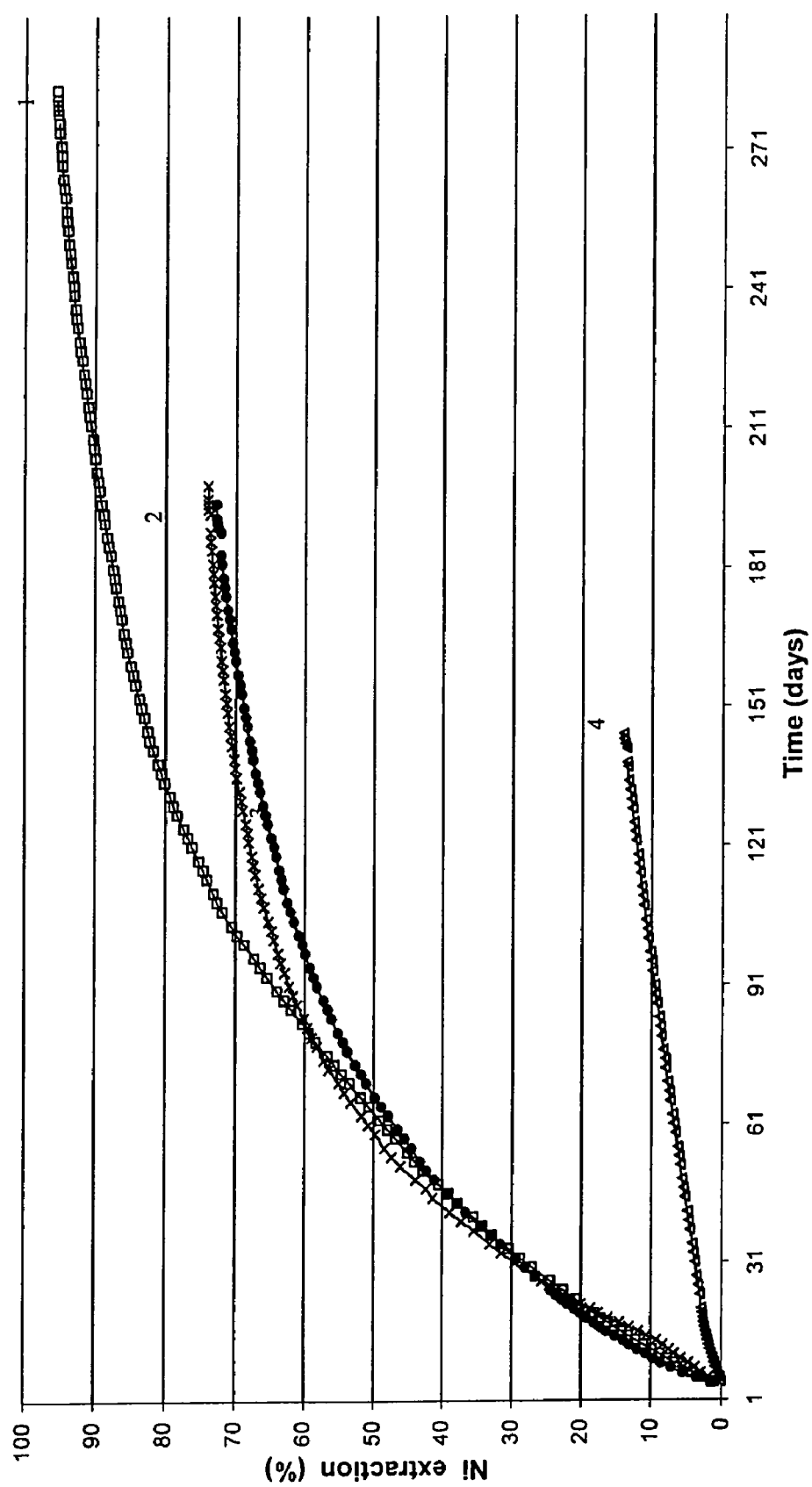
Figure 11:
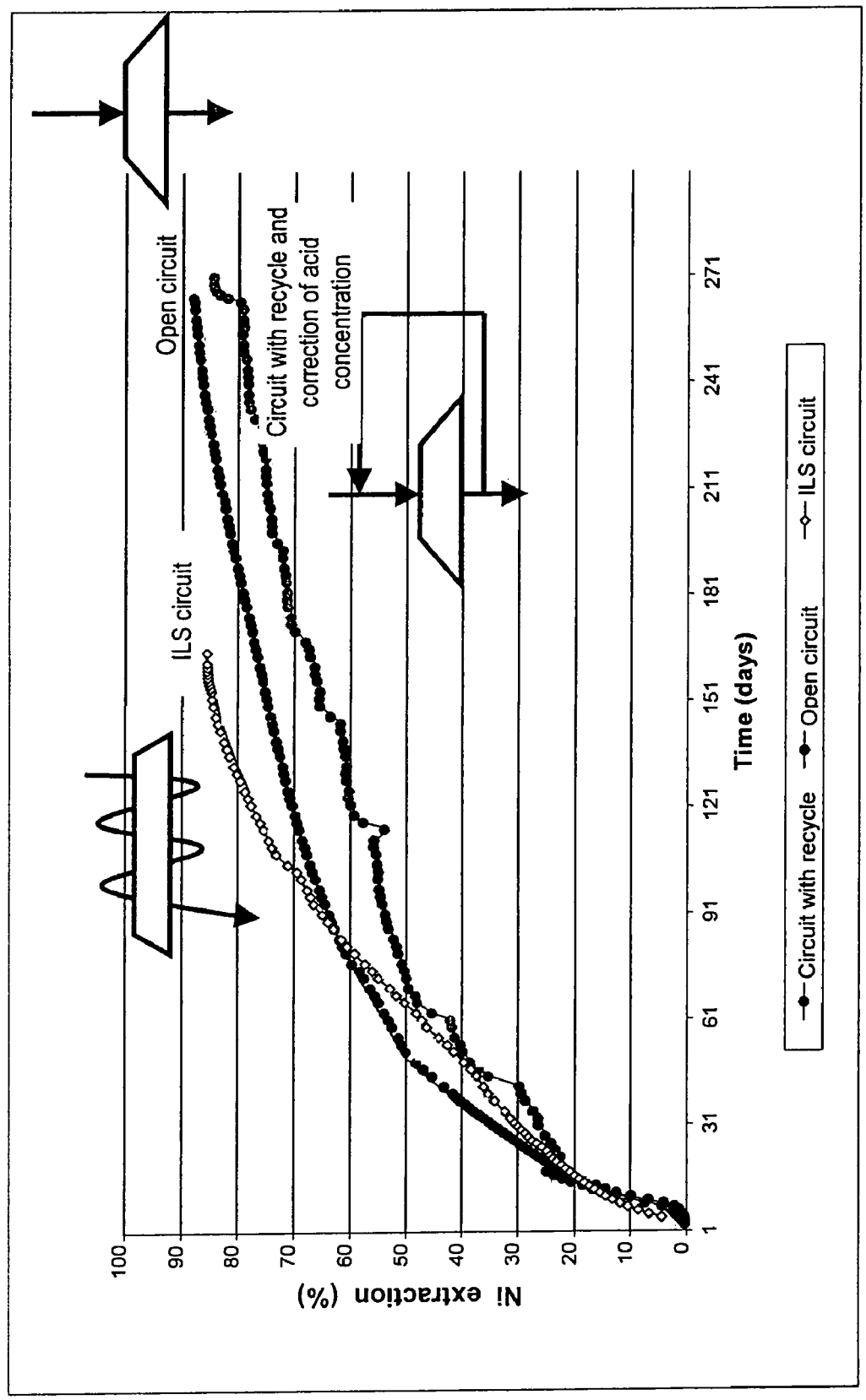
Figure 12:
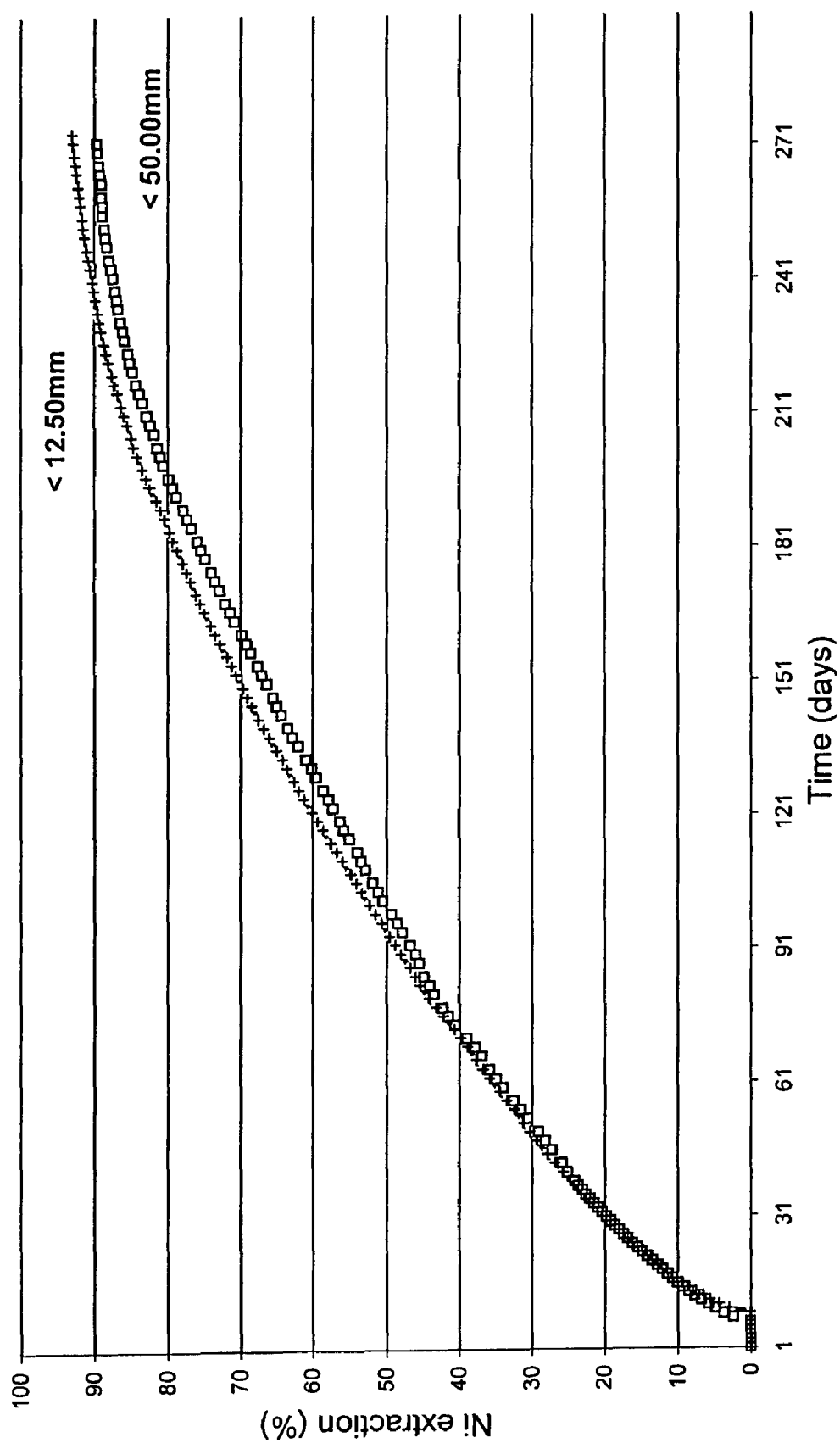

FIG. 1, enclosed hereto, illustrates a type of ore with high porosity, which facilitates leaching agent accessibility.

Next, the crushed product is sent to the agglomeration unit (II) by means of a conveyor belt. If necessary, water may be added to the ore during transport, for example in cases in which the ore is very dry and contains a high amount of fines. Addition of water onto the conveyor belt may be performed in several ways, such as spraying, and minimizes dust formation, thereby rendering more favourable working conditions. Additionally, and this is very important, it minimizes nickel loss, since the concentration of this element in the finer fractions is a characteristic of lateritic ores. Agglomeration is carried out in conventional equipment, such as rotary drums or discs, or even any apparatus that yields the expected result.

In this stage, sulfuric acid, either concentrated or in solution, and water are added to the ore in amounts that are defined according to the amount of fines present (which can be 30-70% lower than 0.074 mm), with the acid and water being added in dosages that are sufficient to produce the desired amount of agglomeration moisture. Agglomeration moisture is determined previously, in bench tests, and is dependent on the physical and mineralogical characteristics of the ore. Because of the ultra-fine fraction present, a binder agent may be added, which may be inorganic or organic, synthetic or natural, or even of mineral origin, as bentonite for example, provided that such agent is inert to the acid of the leaching solution. In the agglomerated product there should be no free fines present, which means any ore fraction smaller than 1.70 mm.

It is worth pointing out that ores with natural basicity due to the high levels of basic constituents, such as MgO or CaO, have high neutralizing potential, and this is the case of saprolitic ores. Therefore, in addition to the already well-known benefits of agglomeration, this stage is also important, in the proposed route, as a pre-neutralizing stage for the ore. The amount of sulfuric acid to be added is defined, taking into account the major acid-consuming mineral species in the process granulometry. This neutralizing action in this stage accelerates the beginning of the extraction of the target metals. When there is no addition of acid in this stage and agglomeration is only carried out with water, either with or without binder agents, a delay is observed in the extraction of target metals, particularly nickel and cobalt, although no significant impact is observed on the total leaching cycle. Normally, magnesium, iron, aluminium, and calcium are the major acid-consuming species.

After agglomeration (II), the ore is stacked (III), forming heaps whose final heights range from about 2 m to about 7 m, preferably 4 meters.

The leaching system (IV) proposed is in dynamic (or on-off) heaps, counter-current, multi-stage, with the number of stages being 2 or more, preferably 3 stages. The system described herein follows the conceptuation as presented by Foust et allii in *Principles of Unit Operations*, mentioned in the description of the state of the art. Being a leaching unit operation, the two phases are comprised of the ore (solute) whose metal values (chiefly Ni and Co) are to be extracted, and the sulfuric acid solution (solvent). The two phases are fed at opposite ends of a series of balanced stages, and flow in directions opposite to each other. With this technique, higher concentrations of Ni and Co in the product of the liquid phase, and a shorter leaching cycle as well, are obtained, and a smaller amount of solvent is used, in comparison with the co-current circuit or parallel flows.

The new leaching solution—a sulfuric acid solution with concentration varying from about 50 g/L to about 200 g/L—is applied to the top or upper surface of the heap of the last stage, or stage 3 in the case of a three-stage system, and the percolated solutions from each stage are collected separately, in individual reservoirs, and used in the following stage according to flow direction.

Solutions from stages 2 and 3 are designated as intermediate solution 2 (ILS2) and intermediate solution 3 (ILS3) respectively, and so on in succession.

The final solution laden with the target metals—the pregnant leaching solution (PLS)—has a residual acidity between about 10 and about 30 g/L.

At the end of the leaching process (IV), in the last stage, or stage 3 in a 3-stage system, the ore is washed with either new water or process water. After being washed, the leached ore is transported to an area that has been impermeabilized and prepared for final deposition of the leaching residues. It is important to understand that, since it is a continuous process, as soon as ore leaching cessates in the last stage, or stage 3 for example, the ore that was in stage 2 passes to stage 3, and that in stage 1 passes to stage 2, and a new section (or heap) enters stage 1.

The heap leaching process, which is the object of the present invention, can be applied to ores containing large amounts of natural fines, and is also an option for the treatment of coarse-grained fractions (for example, over 0.5 mm in grain size). In this latter case, the fine-grained fraction would be subjected to the conventional treatment via autoclave under high pressure, or to atmospheric leaching, or a combination of the two leaching processes.

The invention also considers the final product containing nickel, cobalt, and other metals from laterite ores, obtained by a heap leaching process (IV), or the solution laden with target metals (PLS) obtained by the process according to the invention, already reported.

Different alternatives are evaluated for the treatment of the pregnant solution (PLS), the effluent solution from stage 1—for example, production of mixed precipitate, or verticalization of the process up to production of metallic nickel.

The pregnant solution is subjected to extraction of the iron and aluminium present, by staged precipitation with addition of an alkaline reagent. Next, the iron and aluminium-free solution, or at most with acceptable levels of such, is sent for the extraction of nickel and cobalt (6), which can be extracted or recovered by several techniques, such as precipitation, solvent extraction, or even ion exchange. With solvent extraction or ion exchange resin, metallic nickel is obtained; with precipitation, a mixed hydroxide or sulfide of nickel, cobalt, zinc, and other base metals is produced.

The present application makes reference to certain operational conditions, such as heap height, ore grain-size, and sulfuric acid concentration among others, without limiting their exclusiveness, and pointing out that these conditions may vary in each one of the heap leaching stages without impairing the final outcome of the process.

Although a preferred operational process has been described and illustrated, it is pointed out that alterations in this process are possible and executable, without digressing from the scope of the present invention.

EXAMPLE 1

In order to evaluate the applicability of heap leaching to a refuse fraction (>0.5 mm) from the beneficiation of a laterite ore by HPAL/Atmospheric Leaching route, three samples were composed, the chemical analyses of which are presented in TABLE 3 below, and were subjected to tests in columns 1 m in height.

TABLE 3

Chemical analysis of feed samples

| Description | Al (%) | Co (%) | Cr (%) | Cu (%) | Fe (%) | Mg (%) | Mn (%) | Ni (%) | Si (%) | Ti (%) | Zn (%) |
|---|---|---|---|---|---|---|---|---|---|---|---|
| Sample 1 | 0.83 | 0.03 | 0.58 | 0.02 | 9.65 | 1.55 | 0.21 | 0.31 | 33.65 | 0.05 | 0.02 |
| Sample 2 | 0.72 | 0.03 | 0.67 | 0.03 | 8.54 | 9.52 | 0.11 | 0.46 | 25.10 | 0.03 | 0.03 |
| Sample 3 | 2.37 | 0.09 | 0.78 | 0.06 | 10.20 | 6.42 | 0.37 | 1.36 | 24.70 | 0.24 | 0.05 |

GRAPH 1, enclosed hereto, shows the distribution of nickel in these samples. Nickel is mainly encountered in phyllosilicates (serpentines and chlorites).

The grain size of the samples was determined at 100% below 1.27 mm. Grain size distributions are shown in GRAPH 2 enclosed hereto. The other conditions for execution of these tests were as follows: percolation rate of 10 L/h/m2; sulfuric acid concentration in the leaching solution, 20 g/L; acid dosage in the agglomeration, 20 kg/ton of ore; open-circuit tests.

These preliminary tests indicated the potential for nickel extraction by means of the heap-leaching unit operation. However, the nickel extraction curves in GRAPH 3, enclosed hereto, show that the system required more acid, for example, through a leaching solution with higher concentration. The low acid concentration may have been a factor for the slow kinetics. In 100 days of operation, samples 1, 2 and 3 reached 34%, 58% and 69% of nickel extraction, respectively.

EXAMPLE 2

Tests were performed in 1 m-high columns, and also in 4 m-high columns for a preliminary evaluation of the influence of height on nickel extraction. These tests were executed on samples from four different lithologies, and also on a composite sample from the individual lithotypes. All samples were crushed to a grain size 100% under 12.5 mm. The percolation rate was constant and equal to 10 L/h/m2. Sulfuric acid concentration in the leaching solution was from 20 to 200 g/L in the 1-meter-high columns, and 50 g/L in the 4-meter-high columns.

The nickel extraction curves for the different ore types, under distinct acidity conditions, confirmed the influence of this variable on the process. Higher acidity leads to faster kinetics.

Nickel extraction varied according to the mineralogy. The mineralogy that was most refractory to the process, and therefore yielded the lowest levels of nickel extraction, was the one in which a significant amount of nickel was contained in the iron hydroxides. This refractoriness is understood in terms of the form of occurrence of Ni, which in the crystalline structure of iron hydroxides requires more energy in the system to overcome the high bond energy in these hydroxides. Ni atoms are less accessible to the leaching solution.

GRAPH 4 (nickel extraction saprolitic ore) and GRAPH 5 (nickel extraction ferruginous or limonitic ore), enclosed hereto, show the extraction curves for the tests in 1-meter-high columns, for two of the ore types evaluated.

The tests performed in mini-columns allow evaluation of the maximum possible expected nickel extraction achieved. Since all the types reached stabilization in 100 cycle days, this time was assumed to be the total cycle, and the concentration of acid was varied every 20 days, from 20 to 200 g/L and then from 200 to 20 g/L. The influence of the concentration of acid on the process was confirmed once again. In the test with increasing acidity values, the inflexion of the curve was observed to change as acidity was increased. In the test with decreasing acidity values, this effect was observed to be non-significant.

In these tests, three major stages have been identified in the leaching process under evaluation: neutralization, primary leaching, and secondary leaching, as shown in GRAPH 6 (leaching stages) enclosed hereto. In the first stage, the main reactions involve the minerals that are readily soluble, especially the magnesium-bearing species, and therefore this stage has been identified as neutralization. There are three different kinetics, depending on how nickel is distributed in the minerals: adsorbed Ni between the plates (inter-plate) of phyllosilicates is more easily extracted than Ni within the structure (intra-plate) of these same minerals, which in turn yield more extraction than Ni contained in iron hydroxides.

This behaviour of different leaching zones indicated the importance of evaluating the circuit according to the counter-current principle.

GRAPH 7, enclosed hereto, shows the nickel extraction curves obtained for the four typologies, for the tests in 4 m-high columns.

EXAMPLE 3

Three different options of leaching circuit were evaluated, the extraction curves of which are presented in GRAPH 8 enclosed hereto: open circuit, counter-current circuit with three stages (circuit with ILS), and circuit with PLS recirculation and acid concentration correction.

For the ILS circuit, the total cycle was considered to be 150 days, with 3 stages of 50 days each. The counter-current circuit (ILS) presents itself as the best alternative for the ores evaluated, by substantially shortening the leaching cycle and decreasing the total volume of the solution and the consumption of acid as well, as shown in TABLE 4 below:

TABLE 4

| Circuit type | Leaching cycle (days) | Ni Extraction (%) | Co Extraction (%) | H2SO4 Consumption (kg/ton of ore) |
|---|---|---|---|---|
| ILS | 150 | 84 | 70 | 280 |
| Open | 270 | 87 | 72 | 560 |
| With recycle and acidity correction | 270 | 84 | 70 | 250 |

EXAMPLE 4

Tests were performed on the same sample, in 4-meter-high columns, to evaluate the influence of grain size on nickel extraction. The other conditions of the process, such as concentration of the leaching solution, percolation rate, agglomeration conditions, were maintained constant. It was observed that, for highly porous samples in addition to the fines naturally present in the ore, there is no significant impact on nickel extraction for a top size of 12.5 mm or 50.0 mm, as shown in GRAPH 9 (evaluation of the influence of grain size on nickel extraction) enclosed hereto.

The invention claimed is:

1. A process for extraction of nickel, cobalt, and other metals from laterite ores by heap leaching, comprising the steps of:
   (I) crushing;
   (II) agglomeration;
   (III) stacking; and
   (IV) heap leaching,
   wherein the crushing step comprises:
      primary crushing;
      secondary crushing wherein a maximum grain size between approximately 25.0 mm and approximately 50.0 mm is obtained; and
      tertiary crushing wherein a maximum grain size between approximately 12.5 mm and approximately 6.30 mm is obtained, and
   wherein the heap leaching step is a continuous counter-current, heap leaching process with n (n≧2 and being an integer) serial stages, the ore (solute) sequentially going through each of the n stages from first to n-th stage and, in each stage, being leached by a leaching solution that flows from n-th stage to the first stage, the ore (solute) in each of the first through the (n-1)th stage being leached by the leaching solution that leached the ore (solute) in an immediate next stage, the ore (solute) in the n-th stage being leached by a new leaching solution, upon cessation of leaching in the n-th stage, its solute being removed and new ore being introduced at the first stage, the leaching solution after flowing through the ore (solute) of the first stage being a pregnant leaching solution (PLS) and the PLS being separated to obtain nickel, cobalt, or other metals when the PLS is loaded with nickel, cobalt, or other target metals.

2. The process for extraction of nickel, cobalt, and other metals from laterite ores by heap leaching according to claim 1, wherein the crushing step comprises additional sub-steps to achieve the grain size suitable for the process.

3. The process for extraction of nickel, cobalt, and other metals from laterite ores by heap leaching according to claim 1, wherein water is added to crushed ores before they are sent to the agglomeration step.

4. The process for extraction of nickel, cobalt, and other metals from laterite ores by heap leaching according to claim 1, wherein no free fines, which impair percolation process, are present in the agglomerated product.

5. The process for extraction of nickel, cobalt, and other metals from laterite ores by heap leaching according to claim 1, wherein heaps of ores are of dynamic type.

6. The process for extraction of nickel, cobalt, and other metals from laterite ores by heap leaching according to claim 1, wherein the stacking step forms heaps with heights between about 2 m and about 7 m.

7. The process for extraction of nickel, cobalt, and other metals from laterite ores by heap leaching according to claim 1, wherein the heap leaching process comprises three stages, or n=3.

8. The process for extraction of nickel, cobalt, and other metals from laterite ores by heap leaching according to claim 1, wherein the new leaching solution comprises sulfuric acid solution.

9. The process for extraction of nickel, cobalt, and other metals from laterite ores by heap leaching according to claim 8, wherein the concentration of the sulfuric acid solution is between 50 g/L and 200 g/L.

10. The process for extraction of nickel, cobalt, and other metals from laterite ores by heap leaching according to claim 1, wherein the new leaching solution is introduced at an upper face, or at the top, of the ore (solute) in the n-th stage.

11. The process for extraction of nickel, cobalt, and other metals from laterite ores by heap leaching according to claim 1, wherein the leaching solution that leached the ore (solute) from each stage is an intermediate solution (ILS); and each intermediate solution is collected separately and used in the subsequent stage, according to flow direction.

12. The process for extraction of nickel, cobalt, and other metals from laterite ores by heap leaching according to claim 1, wherein the pregnant leach solution (PLS) presents residual acidity between about 10 g/L and about 30 g/L.

13. The process for extraction of nickel, cobalt, and other metals from laterite ores by heap leaching according to claim 1, wherein at the end of the leaching process in the n-th stage, the leached ore is washed with either new water or process water, and then is considered as a residue.

14. The process for extraction of nickel, cobalt, and other metals from laterite ores by heap leaching according to claim 1, wherein the pregnant leach solution (PLS) laden with metals is subject to a subsequent process for separation of metals contained therein.

15. The process for extraction of nickel, cobalt, and other metals from laterite ores by heap leaching according to claim 1, wherein water, acid, binding agents or other additives are added in the agglomeration step.

16. The process for extraction of nickel, cobalt, and other metals from laterite ores by heap leaching according to claim 15, wherein the acid is sulfuric acid.

17. The process for extraction of nickel, cobalt, and other metals from laterite ores by heap leaching according to claim 16, wherein sulfuric acid, either concentrated or in solution, and water are added in dosages that are sufficient for reaching agglomeration moisture.

18. The process for extraction of nickel, cobalt, and other metals from laterite ores by heap leaching according to claim 15, wherein a binder agent is added, the binder agent being inorganic or organic, synthetic or natural, or of mineral source.

19. The process for extraction of nickel, cobalt, and other metals from laterite ores by heap leaching according to claim 4, wherein fines are ore fractions having a grain size smaller than 1.70 mm.

* * * * *